United States Patent [19]

Disteldorf et al.

[11] 4,330,657

[45] May 18, 1982

[54] PROCESS FOR THE PRODUCTION OF STORAGE-STABLE URETHANE ACRYLS

[75] Inventors: Josef Disteldorf, Herne; Werner Flakus, Recklinghausen; Horst Schnurbusch, Herne, all of Fed. Rep. of Germany

[73] Assignee: Chemische Werke Huls Aktiengesellschaft, Recklinghause, Fed. Rep. of Germany

[21] Appl. No.: 104,669

[22] Filed: Dec. 17, 1979

[30] Foreign Application Priority Data

Feb. 12, 1979 [DE] Fed. Rep. of Germany ....... 2905205

[51] Int. Cl.$^3$ .................... C08G 18/75; C08G 18/67; C08F 283/00; C08G 63/76
[52] U.S. Cl. .................. 528/58; 204/159.19; 525/440; 525/455; 525/920; 528/75
[58] Field of Search ............... 528/75, 58; 204/159.19; 525/440, 455, 920

[56] References Cited

U.S. PATENT DOCUMENTS

| | | | |
|---|---|---|---|
| 3,509,234 | 4/1970 | Burlant et al. | 525/920 |
| 3,642,943 | 2/1972 | Noel | 525/920 |
| 3,876,726 | 4/1975 | Ford et al. | 525/920 |
| 3,975,457 | 8/1976 | Chang et al. | 525/920 |
| 4,005,041 | 1/1977 | Pigott | 528/75 |
| 4,026,939 | 5/1977 | Weiss et al. | 528/75 |
| 4,098,918 | 7/1978 | DeMajistre | 528/75 |
| 4,119,510 | 10/1978 | Williams | 528/75 |
| 4,174,307 | 11/1979 | Rowe | 528/75 |
| 4,210,713 | 7/1980 | Sumiyoshi et al. | 528/75 |
| 4,213,837 | 7/1980 | Bristowe et al. | 525/920 |
| 4,246,391 | 1/1981 | Watson | 528/75 |

*Primary Examiner*—H. S. Cockeram
*Attorney, Agent, or Firm*—Oblon, Fisher, Spivak, McClelland & Maier

[57] ABSTRACT

A process of producing storage-stable urethane acryls which comprises:

(A) forming a prepolymer by reacting one isocyanate group of a cycloaliphatic diisocyanate having two isocyanate groups of substantially different reactivity, with a single NCO reactive hydroxy group-containing acrylic compound which is additionally polymerizable;

(B) reacting said prepolymer with a multifunctional polyol to thereby obtain a substantially NCO-free urethane acryl. Acryl urethanes produced can be used as hot melts or in mixtures with reactive diluents for coatings of plastics, metals, wood, pressboards, glass, leather, concrete, and the like.

11 Claims, No Drawings

PROCESS FOR THE PRODUCTION OF STORAGE-STABLE URETHANE ACRYLS

BACKGROUND OF THE INVENTION

1. Field of the Invention

The present invention relates to storage-stable urethane acryls and to a method for their production.

2. Description of the Prior Art

Efficient, unsaturated resins hardenable through UV radiation, for example, urethane acryls, can be produced, for example, by the reaction of polyols with isocyanates with the addition of unsaturated, for example, olefinic final groups. Such products are hardenable to dry plastic films by adding for example, aromatic ketones and their derivatives, so-called photoinitiators, by means of UV radiation of a wave length of 200–400 nm depending on the thickness of the layer within periods of 0.1–10 seconds.

The properties of the final products result, in an actually known manner, from structurally adjustable conjugations of polyol components with the respective isocyanates and the used olefin structures. In order to produce final products meeting high requirements and being stable to light, the use of aliphatic isocyanates is necessary.

Combinations of polyols especially of oxyesters, with sterically hindered cycloaliphatic diisocyanates, their adducts and derivatives, particularly on the basis of isophorondiisocyanate (IPDI) in accordance with the following structural formula prove to be particularly efficient with regard to light, heat and oxidation resistance:

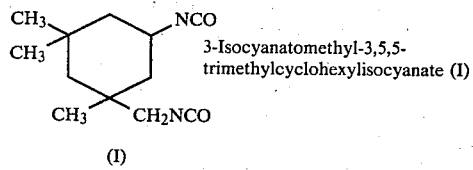

3-Isocyanatomethyl-3,5,5-trimethylcyclohexylisocyanate (I)

(I)

For the production of UV-hardenable acryl urethane resins, it involves relatively few problems to transform bifunctional polyols with diisocyanates and olefinic reactants into moderately viscous, storage-stable acryl urethanes. By doing so, initially the bifunctional polyol is added drop by drop to a suitable reactive diluent which contains already the diisocyanate component with or without catalyst, after a few hours the NCO content is determined and, subsequently, hydroxyalkylacrylate is added with or without catalyst for the production of a largely NCO-free urethane acryl resin.

However, it is also desirable to use tri and tetrafunctional polyols in accordance with the property picture and efficiency.

However, in accordance with the known process, it involves considerable difficulties to carry out the conjugation of polyfunctional, i.e., tri and tetrafunctional oxyesters, with IPDI or other diisocyanates and olefinic reactants since highly viscous products are formed with a very low storage stability. Furthermore, the storage stability of such resins is impaired with the presence of enolizable aromatic activators.

However, resins are required whose viscosity can be controlled and which have a good storage stability. It is actually possible to produce in a known manner storage-stable trifunctional oxyester reaction products with, for example, IPDI but they supply highly viscous final products of a deficient stability after the acrylization. Still greater difficulties are encountered when producing storage-stable tetrafunctional urethane acryl resins which present highly valuable structural elements within the UV-hardenable resins.

SUMMARY OF THE INVENTION

It was now surprisingly determined that it is possible to produce such resins by means of certain measures with a considerably reduced viscosity as well as a storage stability of at least 2 years by reacting tri and tetrafunctional polyols. This applies also to the combined application of bifunctional polyols.

It is, therefore, the object of the invention to develop a process for the production of storage-stable urethane acryls from cycloaliphatic diisocyanates, particularly isophorondiisocyanate, hydroxyalkylacrylates and bi, tri and/or tetrafunctional saturated and/or unsaturated polyols in the presence of reactive diluents in two stages, characterized by the fact that, in the first stage, diisocyanate is subjected to a reaction with hydroxyalkylacrylates in the equivalent ratio NCO:OH of 1:1 in the temperature range of 0°–50° C., particularly 20°–25° C., with organic tin catalysts with 0.001–0.01, particularly 0.002, percent by weight of tin and, in the second stage, the reaction of the NCO-containing acryl urethane formed in the first stage is effected with multifunctional polyols or their mixtures in the equivalent ratio NCO:OH of 1:1 in the temperature range of 0°–100° C., preferably 70° C., with organic tin catalysts with 0.01–0.1, preferably 0.02, percent by weight of tin to obtain practically NCO-free urethane acryls.

DESCRIPTION OF THE PREFERRED EMBODIMENTS

According to the method of the invention, it is possible to obtain a remarkably selectively transformed prepolymer in the first stage of the reaction which is almost free from oligomeric reaction products (monomer content <0.5%). When deviating from these reactive conditions, reactive mixtures are, however, obtained with considerable oligomer proportions and non-transformed diisocyanate whereby the latter leads to direct jellifying of the resin or very high vicosities with deficient storage stability with the subsequent oxyester transformation.

The acryl urethane having NCO-groups thus produced in the first reactive stage in accordance with the invention can practically be regarded as a defined monofunctional NCO prepolymer which now selectively supplies defined acryl urethane derivatives in the second reactive stage through the reaction with polyols of a high functionality (tri and tetrafunctional).

Therefore, in the first reactive step, almost exclusively a monoacryl derivative is formed of the IPDI (III), for example, through the reaction with hydroxyalkylacrylate (II).

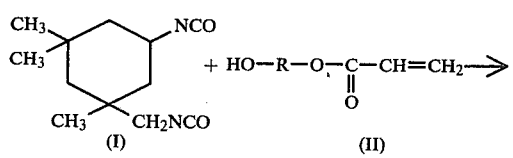

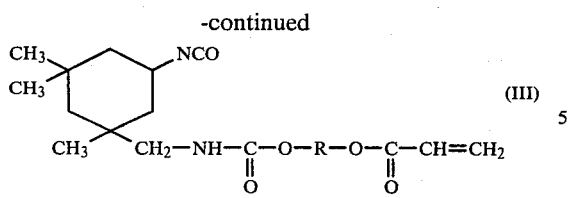

The formation of di-acrylated urethane (oligomer product) and the remaining of non-reacted monomeric diisocyanate (IPDI) is thus practically eliminated (monomer analysis). In case monomeric IPDI would remain, the subsequent reaction with tri and tetrafunctional oxyesters would lead to the latticelike prepolymerization and jellifying of the resins, and to highly viscous unstable compounds with a very limited storage stability.

The selective formation of the monoacryl derivative of IPDI (compound III) sets in when working in accordance with the invention whereby the differing reactivity of both NCO groups of the IPDI molecule guarantees reinforcement of this reaction selectivity. The differing reactivity of the two NCO groups at the IPDI molecule is, however, largely leveled out if the reaction of IPDI is effected in the first step according to the state of the art with polyfunctional polyols as comparative tests have shown. The differing reactivity of the two NCO functions of the IPDI is also leveled out if their reaction is carried out with hydroxyalkylacrylate at a higher temperature than required and/or higher catalyst concentration.

When proceeding in deviation from the invention, i.e., at higher temperatures and/or higher catalytic activation and in another sequence, the viscosity of the obtained products is extremely high and the storage stability of the reaction products is highly unsatisfactory.

The selective formation of the compound III represents the prerequisite to perform the continued reaction of highly functional polyols into NCO-free urethane acryls. Under these conditions, the second reaction step, the reaction of the monoisocyanato-urethane acryls with any highly functional polyols, led to extremely defined reproduceable polyurethanepolyacrylates which are described below in the examples according to their properties and efficiency.

The tri and tetrafunctional acryl urethanes produced according to the invention distinguish themselves as follows:

1. As to viscosity and storage stability, they can be easily handled and are products with a long life which are free from gel parts and are compatible with a great number of olefinic commercially available products, they can be mixed with them and they are free from monomeric parts of hydroxyalkylacrylate.
2. They are UV-reactive products which supply mechanically and chemically extremely resistant coatings for a great number of substrates and owe their properties largely to the high functionality of the polyols used for their production.
3. They are light, oxidation and thermally resistant films of high abrasion resistance and weather resistance which have a good adherence on a great number of substrates and are relatively immune to burning.
4. The acryl urethanes produced in accordance with the invention are, furthermore, characterized by a high compatibility with reactive diluents—which is very limited with many commercially available products—as well as by an excellent dissolving capacity with numerous photo initiators.
5. The acryl urethanes produced in accordance with the invention can be used as hot melts or in mixtures with—advantageously little volatile—reactive diluents for the coating of a multitude of substrates, such as, for example, plastics, metals, wood, pressboards, glass, leather, concrete as well as packing materials or for the production of glass fiber reinforced casting resins and for other applications.

The production of storage-stable urethane acrylates of tri and tetrafunctional structure can only be carried out in a high selectivity, in accordance with the process of this invention, with IPDI or analogously structured polyisocyanates which have reactively differing NCO groups.

The process steps practiced in accordance with the invention permit the transformation of triols of all kinds and, as such, also of oxyester products which can be produced by the transformation of triols, dicarboxylic acids and diols or of triols and lactones in a known manner, into efficient, storage-stable, UV-reactive resins with IPDI monoacrylate. However, additionally also reactants of a tetrafunctional structure, such as reaction products of triols with dicarboxylic acids (mol ratio 2:1), for example trimethylolpropane/adipic acid, can be used for the urethanization and acrylation for the formation of efficient UV-resins. The monomeric and polymeric polyols are so well known to the expert that they need not be described in further detail.

Examples of hydroxyalkylacrylates, i.e., unsaturated additionally polymerizable monomeric organic compounds with a single active hydrogen group reactive with isocyanate, are 2-hydroxyethylacrylate, 2-hydroxyethylmetha 2-hydroxypropylacrylate, 2-hydroxypropylmethacrylate, N-hydroxymethylacrylamide, N-hydroxymethylmethacrylamide, diethyleneglycolmonoacrylate, diethyleneglycolmonomethacrylate, glycerindimethacrylate, trimethylolpropanedimethacrylate and the like.

As an organic tin compound, especially dibutyl tin dilaurate (DBTL) is used but also dibutyl tin acetate, tin octoate, etc.

Regardless of the possibility of the use of the urethane acryl resins produced according to the invention as hot melts, their production is also of technical use in the form of liquid adjustments at room temperature. With the help of reactive diluents, expediently such of low volatility, unlimited dilutions of the selectively produced urethane acryls can be carried out on the basis of the production process according to the invention, also of such which are sprayed, cast or immersed.

Vinylacetate, diallylphthalate, diallylmaleate, vinylpyrrolidone, 2-ethylhexylacrylate, hexanedioldiacrylate and multitude of other olefinic reactants of low viscosity can be used as reactive diluents and their structural effect on the hardening of the UV resins is to be taken into consideration as to their proportions.

The hardening of the resins produced in accordance wth the invention can be effected, for example, with mercury vapor lamps (high and medium pressure) in the wave length range of 150–400 nm. In general, the use of photoinitiators is expedient. More than 100 photochemically effective activators are presently described. Their effectiveness and compatibility, their requirement in quantity and their technical accessibility are very different. Many photo-initiators impair the dye number of resin, the dye number of the film and also the storage stability of resins in the dark.

The hardening of the resins can be effected with different watt outputs. In case of extremely thin coatings <5μ, <8 watts/cm are admissible, in case of coating thicknesses of 40-100μ, 80-120 watts/cm are advantageous. In case of higher coating thicknesses of 200μ and more, it can be appropriate to use radiation units of >120 watts/cm depending on the substrate and working method.

Depending on the output of the lamp and the coating thickness of the resin, fractions of or many seconds of hardening time are required in order to obtain a sufficient hardening of the film.

Having now generally described this invention, the same will be illustrated further by reference to certain specific examples, which are included herein for purposes of illustration only and are not intended to be limiting thereof.

COMPARATIVE EXAMPLE

Urethane acryl resin, produced through the reaction of saturated polyols with IPDI and subsequent acrylization with 2-hydroxyethylacrylate, in detail.

611 g of 2-ethylhexyl acrylate and 635 g of IPDI (2.86 mol) are mixed together, 835 g oxyester on the basis of phthalic acid, adipic acid, hexane diol-1, 6-trimethylolpropane (3:3:6:2 mol) (OH number 190 mg KOH/g substance), 0.2 g of DBTL are added drop by drop to this solution while stirring at 50° C.; after another two hours, the NCO content is determined at 5.8% by weight and the monomer content at 4.5% of IPDI. Then, 2.2 g of DBTL and 365 g of 2-hydroxyethyl acrylate are added drop by drop to the reaction substance at 70° C. and after 24 hours of subsequent reaction, a largely NCO-free urethane acryl resin is obtained; NCO content; 0.29% by weight.

| Material data, resin | |
|---|---|
| Viscosity 20° C. | 93,000 "cSt" = 930 cm²/s |
| Viscosity 50° C. | 4,400 "cSt" = 44 cm²/s |

VARNISH AND FILM RESULTS OF URETHANE ACRYL RESIN

After the hardening with UV radiation of 80 watts/cm in 4 seconds, photo-initiator Irgacure 651 (Ciba-Geigy):

| | |
|---|---|
| Pendulum hardness Konig (seconds) | 45 |
| Hardness Buchholz | 61 |
| Ericsson cupping (mm) | 8.5 |
| Film results | |
| Coating thickness (μ) | 70 |
| Breaking stress (N/mm²) | 18.0 ± 3 |
| Elongation at break (%) | 42 ± 4 |
| Storage stability of the resin at 25° C. | 2 months |
| Storage stability in the dark at 60° C. | 5 days |

EXAMPLE 1

Urethane acryl resin, produced by acrylization of IPDI with hydroxyethylacrylate and subsequent reaction with saturated polyols into largely NCO-free urethane acryls:

A mixture of 0.16 g of dibutyl tin dilaurate (DBTL) (∼0.002% Sn), t11 g of 2-ethylhexylacrylate and 635 g IPDI (2.86 mol) is prepared and 365 g of 2-hydroxyethylacrylate, technical quality, are added drop by drop to this solution by stirring and are subjected to a reaction at 20°-25° C. until the NCO content of the solution reaches 7.4 percent by weight, i.e., after 5-6 hours under these conditions. Then, 2.3 g of dibutyl tin dilaurate and 835 g of oxyester of the basis phthalic acid, adipic acid, hexadiol-1.6, trimethylolpropane (3:3:6:2 mol), OH number 190 mg KOH/g substance are added drop by drop to this reaction solution at 70° C. After 8-10 hours of reaction period, a largely NCO-free urethane acryl resin, NCO content <0.3 percent by weight, is obtained.

The analogously determined substance data of the resin including the varnish and film results after the UV hardening are determined as follows and are to be compared with the comparative example:

| Substance data, resin example 1 | |
|---|---|
| Viscosity 20° C. | 35,400 "cSt" = 354 cm²/s |
| Viscosity 50° C. | 1,950 "cSt" = 19.5 cm²/s |

VARNISH AND FILM AFTER UV HARDENING

| | |
|---|---|
| Pendulum hardness Konig (seconds) | 50 |
| Hardness Buchholz | 65 |
| Ericsson cupping (mm) | 9.5 |
| Coating thickness (μ) | 83 |
| Breaking stress (N/mm²) | 26.0 ± 4 |
| Elongation at break (%) | 70 ± 3 |
| Storage stability of the resin at 25° C. | >18 months |
| Storage stability in the dark at 60° C. | >60 days |

EXAMPLE 2

Urethane acryl resin produced according to Example 1 but instead of IPDI by using the cycloaliphatic diisocyanate Hylene W ®:

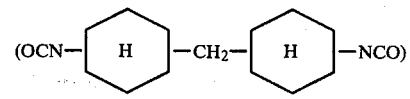

672.50 g of Hylene W (2.56 mol), 327.5 g of 2-hydroxyethylacrylate (technical) (2.8 mol), 586.0 g of 2-ethylhexylacrylate and 0.16 g of DBTL are subjected to a reaction up to an NCO content of 6.8 percent by weight and then subjected to a reaction with 757.0 g of an oxyester according to Example 1 as well as 2.1 g of DBTL in order to obtain a largely NCO-free urethane acryl. NCO content: 0.31 percent by weight.

After UV hardening of the resin, the following substance, varnish and film data were determined:

| Substance data, resin Example 2 | |
|---|---|
| Viscosity 20° C. | approximately 300,000 "cSt" = 3,000 cm²/s |
| Viscosity 50° C. | 18,000 "cSt" = 180 cm²/s |

VARNISH AND FILM DATA AFTER UV HARDENING

| | |
|---|---|
| Pendulum hardness Konig (seconds) | 50 |
| Hardness Buchholz | 67 |
| Ericsson cupping (mm) | 8.8 |
| Coating thickness $\mu$ | 66 |
| Breaking stress (N/mm$^2$) | 25.1 ± 3 |
| Elongation at break (4) | 27 ± 2 |
| Storage stability of the resin at 25° C. | 3 months |
| Storage stability in the dark at 60° C. | 11 days |

EXAMPLE 3

Urethane acryl resin produced in analogy to Example 1 but after the formation of the monoacrylurethaneisocyanate by its further reaction with 309.0 g of a tetrafunctional polyol of the basis trimethylolpropane/adipic acid (in the mol ratio 2:1), OH number 512 mg KOH/g substance.

| | |
|---|---|
| 561.3 | g 2-ethylhexylacrylate |
| 635 | g IPDI |
| 365 | g 2-hydroethylacrylate |
| 0.15 | g DBTL |
| 309.9 | g polyol of the basis trimethylolpropane/adipic acid - OH number 512 |
| 1.5 | g DBTL |

Substance data, resin example 3
Viscosity 20° C.    98,600 "cSt" = 986 cm$^2$/s
Viscosity 50° C.    2,540 "cSt" = 25.4 cm$^2$/s

VARNISH AND FILM DATA AFTER UV HARDENING

| | |
|---|---|
| Pendulum hardness Konig (seconds) | 151 |
| Hardness Buchholz | 111 |
| Ericsson cupping (mm) | 3.3 |
| Coating thickness ($\mu$) | 66 |
| Breaking stress (N/mm$^2$) | 54 ± 6 |
| Elongation at break (%) | 6 ± 1 |
| Storage stability of the resin at 25° C. | >12 months |
| Storage stability in the dark at 60° C. | >60 days |

EXAMPLE 4

Urethane acrylate produced in analogy to Example 1 but after the formation of monoacrylurethaneisocyanate by its further reaction with a polycaprolactone of the OH number 310 mg KOH/g.

| | |
|---|---|
| 0.15 | g DBTL |
| 503.9 | g 2-ethylhexylacrylate |
| 635 | g IPDI |
| 365 | g 2-hydroethylacrylate |
| 511.8 | g polycarprolactone OH number 310 |
| 1.85 | g DBTL |

Substance data, resin example 4
Viscosity 20° C.    47,000 "cSt" = 470 cm$^2$/s
Viscosity 50° C.    2,500 "cSt" = 25 cm$^2$/s

VARNISH AND FILM DATA AFTER UV HARDENING

| | |
|---|---|
| Pendulum hardness Konig (seconds) | 90 |
| Hardness Buchholz | 100 |
| Ericsson cupping (mm) | 10.6 |
| Coating thickness ($\mu$) | 80 |
| Breaking stress (N/mm$^2$) | 25.6 ± 1.6 |
| Elongation at break (%) | 17 ± 6 |
| Storage stability of the resin at 25° C. | >9 months |
| Storage stability in the dark at 60° C. | >20 days |

EXAMPLE 5

Urethane acryl resin produced in analogy to Example 1 but after the formation of the monoacrylurethaneisocyanate by its further reaction with a bifunctional polyol of the basis phthalic acid, neopentylglycol, hexandiol-1,6 in the mol ratio 4:2.5:2, OH number 85 mg KOH/g.

| | |
|---|---|
| 955 | g 2-ethylhexylacrylate |
| 635 | g IPDI |
| 365 | g 2-hydroxyethylacrylate |
| 0.2 | g DBTL |
| 1,866 | g oxyester of the basis phthalic acid, neopentylglycol, hexandiol-1.6 (4:2.5:2.5) |
| 3.6 | DBTL |

Substance data, resin example 5
Viscosity 20° C.    40,000 "cSt" = 400 cm$^2$/s
Viscosity 50° C.    2,100 "cSt" = 21 cm$^2$/s

VARNISH AND FILM DATA AFTER UV HARDENING

| | |
|---|---|
| Pendulum hardness Konig (seconds) | 29 |
| Hardness Buchholz | 48 |
| Ericsson cupping (mm) | 10.7 |
| Coating thickness ($\mu$) | 70 |
| Breaking stress (N/mm$^2$) | 10.3 ± 1.3 |
| Elongation at break (%) | 100 ± 7 |
| Storage stability of the resin at 25° C. | >7 months |
| Storage stability in the dark at 60° C. | 15 days |

EXAMPLE 6

80 parts resin Example 1
20 parts of a resin was produced in analogy to Example 1 as follows:

| | |
|---|---|
| 635 | g IPDI |
| 365 | g 2-hydroxyethylacrylate |
| 563 | g 2-ethylhexylacrylate |
| 0.15 | g DBTL |
| 314 | g oxyester of the basis phthalic acid-trimethylolpropane (1:2) OH number 505 mg KOH/g |
| 1.5 | g DBTL |

Substance data, resin example 6
Viscosity 20° C.    39,600 "cSt" = 396 cm$^2$/s
Viscosity 50° C.    2,300 "cSt" = 23 cm$^2$/s

VARNISH AND FILM DATA AFTER UV HARDENING

| | |
|---|---|
| Pendulum hardness Konig (seconds) | 105 |
| Hardness Buchholz | 100 |
| Ericsson cupping (mm) | 7.0 |
| Coating thickness ($\mu$) | 74 |
| Breaking stress (N/mm$^2$) | 32.3 ± 1.6 |
| Elongation at break (%) | 14 ± 3 |
| Storage stability of the resin at 25° C. | >12 months |
| Storage stability in the dark at 60° C. | 60 days |

Having now fully described this invention, it will be apparent to those skilled in the art that the same can be changed by obvious variations and modifications without changing the spirit or scope thereof.

What is claimed as new and intended to be covered by Letters Patent of the United States is:

1. A process for producing storage-stable urethane lacquers which comprises:
   (A) forming a prepolymer by reacting one isocyanate group of a cycloaliphatic diisocyanate having 2 isocyanate groups of substantially different reactivity, with the hydroxy group of a mono hydroxy group containing acrylic compound which is polymerizable by addition, wherein the temperature is about 0°–50° C. and the reaction is carried out in the presence of 0.001–0.01% by weight on the basis of tin of an organic tin catalyst;
   (B) reacting said prepolymer with a multifunctional polyol or mixtures thereof, in an equivalent ratio of NCO:OH of 2:1, in the presence of 0.01–0.1% by weight on the basis of tin of an organic tin catalyst; to thereby obtain a substantially NCO-free urethane acryl.

2. The process of claim 1, wherein the temperature of said step (A) is 20°–25° C.

3. The process of claim 1, wherein the organic tin catalyst present in said step (A) is present in an amount of 0.002% by weight, on the basis of tin.

4. The process of claim 1, wherein the temperature of said step (B) is about 70° C.

5. The process of claim 1, wherein the organic tin catalyst in said step (B) is present in an amount of 0.02% by weight of tin.

6. The process of claim 1, wherein said cycloaliphatic diisocyanate is isophorone diisocyanate.

7. The process of claim 1, wherein said hydroxy group-containing acrylic compound is selected from the group consisting of hydroxy (lower) alkylacrylate, hydroxy (lower) alkylmethacrylate, N-hydroxy (lower) alkylacrylamide, and N-hydroxy (lower) alkylmethacrylamide.

8. The process of claim 1, wherein said organic tin catalyst is selected from the group consisting of dibutyl tin dilaurate, dibutyl tin acetate, and tin octoate.

9. The process of claim 8, wherein said tin catalyst is dibutyl tin dilaurate.

10. The process of claim 1, wherein said hydroxy group-containing unsaturated acrylic compound is selected from the group consisting of 2-hydroxyethylacrylate, 2-hydroxyethylmethacrylate, 2-hydroxypropylacrylate, 2-hydroxylpropylmethacrylate, N-hydroxymethylacrylamide, N-hydroxymethylmethacrylamide, diethyleneglycolmonoacrylate, diethyleneglycolmonomethylmethacrylate, glycerinedimethacrylate and trimethylolpropanedimethacrylate.

11. The urethane acryl prepared by the process of claim 1.

* * * * *